United States Patent [19]
Weber, Jr.

[11] 4,002,375
[45] Jan. 11, 1977

[54] SERVICE PORTION FOR BRAKE CONTROL VALVES

[75] Inventor: Charles L. Weber, Jr., North Huntingdon, Pa.

[73] Assignee: Westinghouse Air Brake Company, Wilmerding, Pa.

[22] Filed: Apr. 5, 1976

[21] Appl. No.: 673,730

[52] U.S. Cl. .................................. 303/33; 303/38
[51] Int. Cl.² ........................................ B60T 15/22
[58] Field of Search ........................... 303/33–39, 303/80

[56] References Cited
UNITED STATES PATENTS

| 2,994,565 | 8/1961 | McClure et al. | 303/35 X |
| 3,175,869 | 3/1965 | Kirk | 303/33 |
| 3,232,678 | 2/1966 | Wilson | 303/80 |
| 3,716,276 | 2/1973 | Wilson et al. | 303/36 X |

Primary Examiner—Duane A. Reger
Attorney, Agent, or Firm—W. F. Poore; R. W. McIntire, Jr.

[57] ABSTRACT

A service valve portion of a railway vehicle brake control valve device embodies large capacity spool-type brake cylinder application and release piston valves and a small spool-type valve for controlling the supply and release of fluid under pressure to and from the application and release piston valves and also the reservoir charging and quick service features.

10 Claims, 5 Drawing Figures

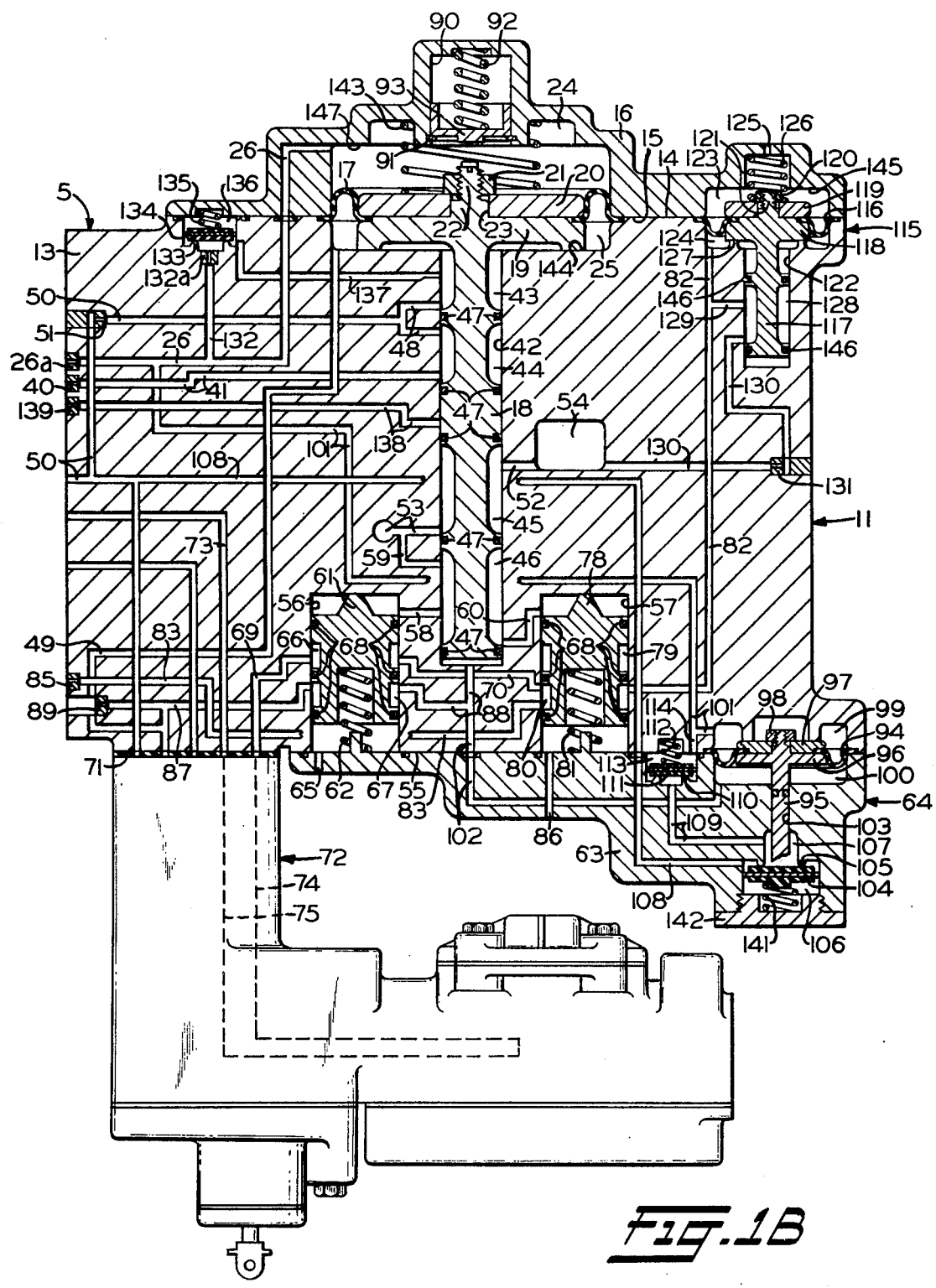

SERVICE PORTION FOR BRAKE CONTROL VALVES

BACKGROUND OF THE INVENTION

For many years brake control valve devices used on railway vehicles have comprised both a service valve device and an emergency valve device each of which has a main slide valve that has passageways and cavities therein. This main slide valve has a flat bottom slidably mounted on a ported flat slide valve seat formed on and within a casing member. A graduating slide valve that has a flat bottom is slidable with respect to a ported flat valve seat provided therefor on the top of the main slide valve.

The maintenance of slide valves is expensive in that mechanics having considerable skill are required to lap and fit a slide valve to its seat. On the other hand, most any ordinary workman is able to remove worn O-ring seals from a spool-type valve and replace them with new seals.

According to the present invention, a railway vehicle brake control valve device is provided with a service valve portion, the valve body of which has therein a plurality of passageways opening at their respective opposite ends at the wall surface of bores in this body, each bore having slidably mounted therein a spool-type valve the periphery of which is provided with one or more elongated annular grooves and, adjacent each end of each elongated annular groove, an annular groove in which is disposed an O-ring seal that forms a fluid tight seal with the wall surface of the corresponding bore. A pair of large diameter bores has large capacity spool-type brake cylinder application and release piston valves slidably mounted therein to control the flow of fluid under pressure to and from a brake cylinder while another spool-type valve of smaller diameter slidably mounted in a third bore and operated by a movable abutment connected thereto controls the supply and release of the fluid under pressure for operating the two large capacity spool-type piston valves, the charging of an auxiliary and an emergency reservoir from a train brake pipe and the release of fluid under pressure from a train brake pipe to a quick service volume chamber. The service portion of this brake control valve device also includes diaphragm-operated limiting and accelerated service release valves for respectively controlling flow of fluid under pressure from the quick service volume chamber to the brake cylinder and from the emergency reservoir to the train brake pipe when effecting a brake release subsequent to a service brake application.

SUMMARY OF THE INVENTION

According to the present invention, a brake control valve device for use on a railway vehicle comprises a service portion or triple valve device that has a body or casing provided therein with a plurality of bores of different diameter and internal passageways extending from the wall surface of these bores either to the wall surface of another bore or to the exterior surface of the valve body. Slidably and sealably mounted in a pair of the larger bores are two spool-type piston valves of large diameter to provide sufficient flow capacity for controlling respectively the supply of a sufficient volume of fluid under pressure to a brake cylinder for effecting a brake application and the release of this volume of fluid under pressure from this cylinder to atmosphere to effect a subsequent release of the application. A spool-type valve of substantially smaller diameter is slidably and sealably mounted in a bore of corresponding diameter and is operable upon movement to different positions by variations of pressure on one or the other side of a movable abutment connected thereto to control (1) the supply and release of fluid under pressure for effecting the operation of the two spool-type piston valves of large capacity, (2) charging of a pair of reservoirs, (3) the release of fluid under pressure from a train brake pipe to a quick service volume to cause a rapid reduction of pressure in the train brake pipe to run serially from the locomotive through the train to the last car, and (4) upon effecting a brake release subsequent to an application, flow of fluid under pressure from one of the reservoirs to both the other reservoir and also the train brake pipe.

In the accompanying drawings:

FIG. 1A and FIG. 1B, when taken together such that the right-hand edge of FIG. 1A is matched with the left-hand edge of FIG. 1B, constitute a diagrammatic view of a brake control valve device having an emergency portion shown in outline and an improved service valve portion embodying therein a plurality of spool-type valves.

DESCRIPTION

Figure 1A:
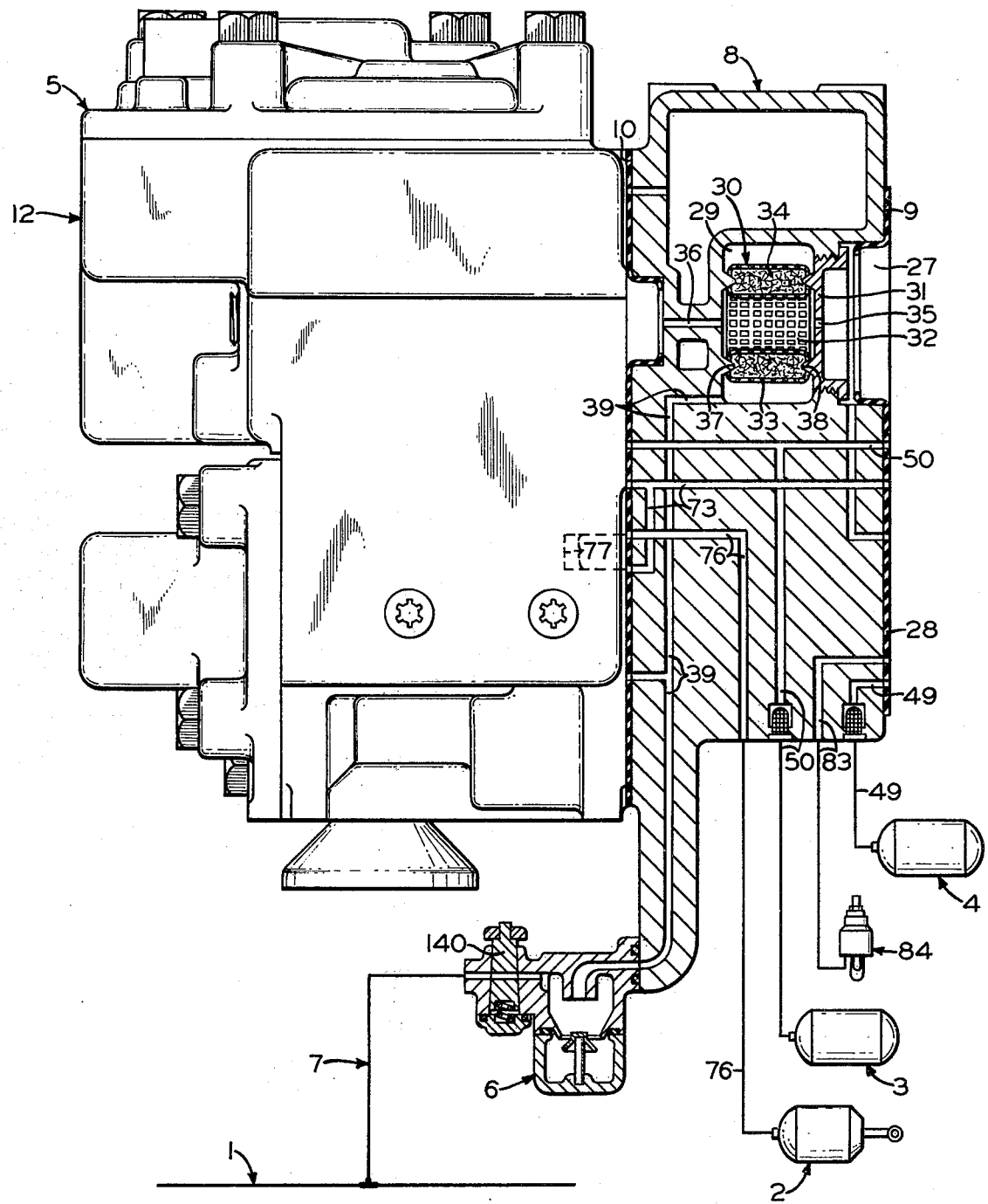

As shown in FIGS. 1A and 1B of the drawings, when the right-hand edge of FIG. 1A is placed alongside of the left-hand edge of FIG. 1B, an improved railway freight car fluid pressure brake apparatus embodying the invention comprises a brake pipe 1 that extends from one end of the car to the other, a brake cylinder 2, an emergency reservoir 3, an auxiliary reservoir 4, and a brake control valve device 5 connected to the brake pipe 1 through a combined cut-out cook and centrifugal dirt collector 6 and a branch pipe 7.

The brake control valve device 5 may comprise a pipe bracket 8 having gasket faces 9 and 10 disposed at opposite ends thereof, a triple valve device or service portion 11 secured to the face 9 with a gasket disposed therebetween, and an emergency valve device or portion 12 secured to the face 10 with a gasket between this face 9 and valve device 12. The parts described above are standard components of the well-known ABD freight car brake apparatus now used on the freight cars of most American railroads.

According to the invention, the triple valve device or service portion 11 of brake control valve device 5 is provided with spool-type valves rather than slide valves of the type shown and described in U.S. Pat. No. 3,175,869, issued Mar. 30, 1965, to Walter B. Kirk and assigned to the assignee of the present application.

The well-known ABD freight car brake equipment described in U.S. Pat. No. 3,175,869, may be modified by removing the triple valve device or service portion from the pipe bracket shown in this patent and replacing it with the triple valve device or service portion 11 constituting the present invention.

As shown in FIG. 1B of the drawings, the triple valve device or service portion 11 comprises a body or casing 13 that has an upper face 14 between which and a lower face 15 formed on a top cover member 16 is clamped the outer periphery of a movable abutment or annular flexible diaphragm 17, this cover member 16 being secured to the body 13 by any suitable means (not shown).

The inner periphery of the diaphragm 17 is operatively connected to one end of a small diameter spool-type main valve 18 that has formed integral with its upper end a diaphragm follower 19 against which this inner periphery is clamped by a diaphragm follower plate 20 and a nut 21 that has screw-threaded engagement with screw threads formed on a stem 22 that is integral with the diaphragm follower 19 and extends through a bore 23 provided therefor in the diaphragm follower plate 20.

The diaphragm 17 cooperates with the cover member 16 and the casing 13 to form within the service portion 11 and on the respective opposite sides of this diaphragm 17, two chambers 24 and 25.

Opening into the chamber 24 is one end of a passageway 26 that extends through the cover member 16 and casing 13 to a choke 26a carried in the left-hand side of this casing. This choke 26a controls the rate of flow of fluid under pressure between the passageway 26 and a chamber 27 (FIG. 1A) formed by the cooperative relationship of the pipe bracket 8 and the casing 13 that is secured to the gasket face 9 of this pipe bracket by any suitable means (not shown), there being a ported gasket 28 constructed of some suitable resilient material such as, for example, rubber disposed between this face 9 and the left-hand side of the casing 13.

Formed in the pipe gasket 8 are a plurality of fluid conducting passageways which are open to the several clamping faces of this bracket where they are adapted to register with corresponding passageways formed in the emergency valve device 12, the casing 13 of the service valve device 11 and the combined cut-out cook and centrifugal dirt collector 6.

There is also formed in the pipe bracket 8 a chamber 29 open at one end and containing a strainer device 30 which is inserted through the open end of this chamber. This strainer device 30 is secured to the pipe bracket 8 by means of a screw plug 31 having screw-threaded engagement with internal screw threads provided therefor in the bracket 8. Such a strainer device is described and claimed in U.S. Pat. No. 2,014,895, issued Sept. 17, 1935, to Ellis E. Hewitt and assigned to the assignee of the present application. Briefly, however, the strainer device 30 comprises a perforated tubular retainer 32 and a perforated tubular retainer 33 which surrounds the retainer 32. The space between these retainers is packed with hair 34 or any other material suitable for separating dirt, moisture or the like from a stream of fluid under pressure. The inner surface of the retainer 32 defines a passageway which is open to the chamber 27 through a restricted port or choke 35 in the screw plug 31 and also open to a chamber (not shown) in the emergency valve device 12 through a passageway 36 in the pipe bracket 8. The inner wall of the chamber 29 is provided with an annular rib 37 and the screw plug 31 is provided with a similar rib 38 between which ribs the strainer device 30 is clamped by the plug 31.

The brake pipe 1 is connected to the chamber 29 through the branch pipe 7, combined cut-out cook and centrifugal dirt collector 6, and a passageway 39 extending through the pipe bracket 8.

It will be noted from FIGS. 1A and 1B that fluid under pressure may flow from the brake pipe 1 to the emergency valve device 12 via branch pipe 7, combined cut-out cook and dirt collector 6, passageway 39, chamber 29, strainer device 30 and passageway 36. Likewise, fluid under pressure from the brake pipe 1 flows through the strainer device 30 to the chamber 24 (FIG. 1B) above diaphragm 17 via choke 35, chamber 26, choke 26a and passageway 26.

Fluid under pressure also flows through the strainer device 30 to the chamber 27 and thence through a brake pipe charging choke 40 carried in the left-hand side of the casing 13 to one end of a passageway 41 that extends through this casing 13 and at its opposite end opens at the wall surface of a bottomed bore 42 provided in the casing 13 for receiving slidably therein the hereinbefore-mentioned spool-type main valve 18. This brake pipe charging choke 40, the diameter of which is less than that of the hereinbefore-mentioned choke 26a, controls the rate at which fluid under pressure may flow from the brake pipe 1 to the auxiliary reservoir 4 and emergency reservoir 3.

As shown in FIGS. 1B, 2, 3 and 4 of the drawings, the main spool-type valve 18 is provided between the diaphragm follower 19 and its lower end with four spaced-apart elongated peripheral annular grooves 43, 44, 45 and 46. In order to prevent leakage of fluid under pressure along the bottomed bore 42 from one of the elongated peripheral annular grooves on the spool valve 18 to another and from one to another of a plurality of passageways opening at the wall surface of this bottomed bore 42, the spool valve 18 is provided with five spaced-apart peripheral grooves in each of which is carried an O-ring seal 47 that forms a seal with the wall surface of the bottomed bore 42.

It will be noted from FIG. 1B that, while the spool valve 18 occupies its release position in which it is shown, the groove 44 on this valve 18 establishes a communication between that end of the passageway 41 that opens at the wall surface of the bottomed bore 42 and one end of a passageway 48 that opens at the wall surface of this bottomed bore 42 above the location at which the end of the passageway 41 opens at this wall surface. This passageway 48 extends through the casing 13 and at its opposite end opens at the wall surface of the bottomed bore 42 at a location that, while this valve 18 occupies its release position in which it is shown in FIG. 1B, is above the upper O-ring seal 47 carried by this valve 18. Therefore, the fluid under pressure that is supplied from the brake pipe 1 to the passageway 41 flows therefrom to the chamber 25 via the groove 44, passageway 48 and groove 43 at a rate determined by the size of brake pipe charging choke 40.

As shown in FIG. 1B, opening into the chamber 25 is one end of a passageway 49 that extends through the casing 13 and pipe bracket 8 (FIG. 1A) and is connected by a correspondingly numbered pipe to the auxiliary reservoir 4. Consequently, fluid under pressure that flows from the brake pipe 1 to the chamber 25 via the pathway described above flows from this chamber 25 to the auxiliary reservoir 4 via the passageway and pipe 49 to effect charging of this reservoir at a rate determined by the size of brake pipe charging choke 40.

In order to effect charging of the emergency reservoir 3 from the brake pipe 1, this reservoir 3 is connected by a pipe 50 and a correspondingly numbered passageway extending through the pipe bracket 8 and casing 13 to the passageway 48 intermediate the ends thereof. An emergency reservoir charging choke 51 is disposed in the passageway 50 to control the rate of charging of the emergency reservoir 3.

While the spool valve 18 occupies its release position in which it is shown in FIG. 1B, the elongated groove 45 thereon establishes a communication between one end of a passageway 52 that opens at the wall surface of the bottomed bore 42 and one end of a passageway 53 that opens at the wall surface of this bottomed bore 42 at a location below the opening of the one end of the passageway 52 at this wall surface. The passageway 52 extends through the casing 13 and at its other end opens into a cavity 54 formed in this casing 13. This cavity 54 constitutes a quick service volume chamber into which fluid under pressure from the brake pipe 1 is vented when effecting a brake application. The passageway 53 extends through the casing 13 to the exterior surface thereof and constitutes an exhaust communication whereby the quick service volume chamber 54 is open to atmosphere via passageway 52, groove 45 and passageway 53 while the spool valve 13 occupies its release position in which it is shown in FIG. 1B.

As shown in FIG. 1B, extending into the casing 13 from a lower face 55 thereon are two parallel spaced-apart bottomed bores 56 and 57 the axes of which are parallel to and disposed on the respective opposite sides of the axis of the bottomed bore 42.

Opening at the wall surface of the bottomed bore 56 near the upper end thereof is one end of a passageway 58 that extends through the casing 13 and at its other end opens at the wall surface of the bottomed bore 42 at such a location that, while the spool valve 18 occupies its release position in which it is shown in FIG. 1B, the groove 46 on this valve 18 establishes a communication between this passageway 58 and a passageway 59 one end of which opens at the wall surface of the bottomed bore 42 at a location above the location at which the above-mentioned other end of the passageway 58 opens at this wall surface. The passageway 59 extends through the casing 13 and at its other end opens into the aforementioned passageway 53 in this casing 13 intermediate the ends of this passageway 53.

Opening into the bottomed bore 57 adjacent the upper end thereof is one end of a passageway 60 that extends through the casing 13 and at its other end opens at the wall surface of the bottomed bore 42 at such a location that the groove 46 on the spool valve 18, while this valve occupies its release position in which it is shown in FIG. 1B, establishes a communication between the passageways 60 and 59. Consequently, while the spool valve 18 occupies its release position, the upper end of each of the bottomed bores 56 and 57 is open to atmosphere.

As shown in FIG. 1B, a large capacity spool-type brake cylinder application piston valve 61 is slidably mounted in the bottomed bore 56, the diameter of this spool-type piston valve 61 being, for example, 3.6 times the diameter of the main spool-type valve 18. This piston valve 61 is normally biased to its upper position in which it is shown by a spring 62 that is interposed between the lower end of this valve 61 and a bottom cover member 63 that embodies therein an accelerated service release valve device 64 hereinafter described in detail. This cover member 63 is secured to the lower face 55 of the casing 13 by any suitable means (not shown) and is provided with a first vent passageway 65 whereby the lower end of the piston valve 61 is constantly open to atmosphere.

Intermediate its ends the spool valve 61 is provided with two spaced-apart elongated peripheral annular grooves 66 and 67. Between the adjacent ends of these two grooves 66 and 67 and between the other end of each of these grooves and the adjacent end of the piston valve 61 this valve is provided with a peripheral annular groove that has disposed therein an O-ring seal 68.

While the spool valve 61 occupies its upper position in which it is shown in FIG. 1B, the upper groove 66 thereon establishes a communication between a pair of passageways 69 and 70, one end of each of which opens at the wall surface of the bottomed bore 56 diametrically opposite that of the other.

The passageway 69 extends through the casing 13 to a bolting face 71 formed on this casing. Secured to the bolting face 71 by any suitable means (not shown) is a combined reservoir and brake cylinder release valve device 72 that may be the same in construction and operation as the valve device 10 shown and described in U.S. Pat. No. 3,232,678, issued Feb. 1, 1966, to William G. Wilson and assigned to the assignee of the present application. Briefly, however, this combined reservoir and brake cylinder release valve device 72 is effective to normally establish in one of two positions a communication between the end of the passageway 69 that terminates at the bolting face 71 and a passageway 73 in the casing 13 one end of which passageway 73 also terminates at the bolting face 71. This communication is indicated in FIG. 1B by two dotted lines denoted by the reference numerals 74 and 75. As explained in detail in U.S. Pat. No. 3,232,678, the valve device 72 may be manually operated to disconnect that portion of the communication denoted by the numeral 74 from that portion of this communication denoted by the numeral 75 and connect this portion denoted by the numeral 75 to atmosphere to release fluid under pressure from this portion denoted by the numeral 75 and the passageway 73 which is connected to the brake cylinder 2 (FIG. 1A) in a manner now to be described.

The passageway 73 (FIG. 1B) extends from the bolting face 71 through the casing 13 and the pipe bracket 8 (FIG. 1A) to the emergency valve device 12. This emergency valve device 12 is substantially the same in construction and operation as the emergency valve device of the brake control valve device described and claimed in U.S. Pat. No. 2,031,213, issued Feb. 18, 1936, to Clyde C. Farmer and assigned to the assignee of the present application. Briefly, however, this emergency valve device 12 embodies valve means for normally establishing a communication between that portion of the passageway 73 extending through the pipe bracket 8 and one end of a passageway 76 that extends through this pipe bracket 8 and is connected by a correspondingly numbered pipe to the brake cylinder 2. This communication is indicated on FIG. 1A of the drawings by a dotted line which is denoted by the reference numeral 77.

Referring now to FIG. 1B of the drawings, it will be seen that the above-mentioned passageway 70 extends through the casing 13 and at its other end opens at the wall surface of the bottomed bore 57 intermediate the ends thereof.

Slidably mounted in the bottomed bore 57 is a large capacity spool-type brake cylinder exhaust piston valve 78 that may be identical to, and, therefore, interchangeable with, the spool-type brake cylinder application piston valve 61. Accordingly, a railway company using the brake control valve device 5 constituting the present invention would have to stock in their storerooms for repairs a single item or piston valve rather than two items.

Since the spool-type piston valve 78 is identical to the spool-type piston valve 61, this piston valve 78 carries in peripheral annular grooves formed thereon three O-ring seals 68.

Moreover, this piston valve 78, like the piston valve 61, is provided with two spaced-apart elongated peripheral annular grooves 79 and 80, these grooves being so located on the piston valve 78 that an O-ring seal 68 is adjacent each end of each of these grooves. A spring 81 interposed between the lower end of this piston valve 78 and the bottom cover member 63 normally biases this piston valve 78 to its upper position in which it is shown in FIG. 1B in which position the groove 80 thereon establishes a communication between that end of the passageway 70 that opens at the wall surface of the bottomed bore 57 and one end of a passageway 82 that opens at this wall surface diametrically opposite the opening of the passageway 70.

Also, while the piston valve 78 occupies the position in which it is shown in FIG. 1B, the groove 80 thereon establishes a communication between that end of the passageways 70 and 82 that open at the wall surface of the bottomed bore 57 and one end of a passageway 83 that opens at this wall surface below the opening of the passageway 70. This passageway 83 extends through the casing 13 and pipe bracket 8 (FIG. 1A) and is connected by a correspondingly numbered pipe to a retainer valve device 84 that may be the same in construction and operation as the brake cylinder retainer valve device shown and described in U.S. Pat. No. 3,794,071, issued Feb. 26, 1974, to Daniel G. Scott and assigned to the assignee of the present invention.

Consequently, while the spool-type piston valve 78 occupies its upper position in which it is shown in FIG. 1B, the brake cylinder 2 shown in FIG. 1A is open to atmosphere via pipe and passageway 76, the communication denoted by the reference numeral 77, the passageway 73, the communication denoted by the reference numerals 75 and 74 (FIG. 1B), passageway 69, groove 66 on piston valve 61, a passageway 70, groove 80 on piston valve 78, passageway and pipe 83, and the retainer valve device 84 (FIG. 1A) which it may be assumed occupies its direct exhaust position in which no fluid under pressure is retained in the brake cylinder 2. A brake cylinder exhaust choke 85 is disposed in the passageway 83 to control the rate of release of fluid under pressure from the brake cylinder 2 to atmosphere.

A second vent passageway 86 (FIG. 1B) is provided in the cover member 63 whereby the lower end of the spool-type piston valve 78 is constantly open to atmosphere.

While the piston valve 61 occupies its upper position in which it is shown in FIG. 1B, the hereinbefore-mentioned groove 67 thereon establishes a communication between a pair of passageways 87 and 88 in the casing 13, one end of the passageway 87 opening at the wall surface of the bottomed bore 56 diametrically opposite the opening of one end of the passageway 88 at this wall surface. The passageway 87 extends through the casing 13 and at its opposite end opens into the hereinbefore-mentioned passageway 49 intermediate the ends thereof. A brake cylinder buildup choke 89 is disposed in the passageway 87 at its junction with the passageway 49 which is connected to the auxiliary reservoir 4 to control the rate of flow of fluid under pressure from this reservoir 4 to the brake cylinder 2 in a manner hereinafter explained.

The above-mentioned passageway 88 extends through the casing 13 and at its other end opens into the bottom of the bottomed bore 42. This enables the effective area of the lower side of the diapragm 17 to be subject to the pressure in the auxiliary reservoir 4 and the effective area of the upper side of this diaphragm to be subject to the pressure in the brake pipe 1, it being understood that, while the brakes are released and the brake apparatus constituting the present invention fully charged, the pressure in the auxiliary reservoir 4 and the pressure in the brake pipe 1 are equal.

As shown in FIG. 1B of the drawings, the hereinbefore-mentioned top cover member 16 is provided with a bottomed bore 90 that adjacent its lower end is provided with a groove in which is inserted a snap ring 91 subsequent to placing a spring 92 and a stabilizing cup-shaped piston 93 in this bottomed bore 90.

The hereinbefore-mentioned accelerated service release valve device 64 comprises an annular abutment or flexible diaphragm 94 the outer periphery of which is clamped between casing 13 and the bottom cover member 63, as shown in FIG. 1B.

The inner periphery of the diaphragm 94 is operably connected to a valve operating stem 95 having integral therewith a diaphragm follower 96 by an annular follower plate 97 and a nut 98 that has screw-threaded engagement with external screw threads provided on that portion of the stem 94 that extends above the diaphragm follower 96 and through the follower plate 97.

The diaphragm 94 cooperates with the casing 13 and cover member 63 to form on the respective opposite sides of the diaphragm 94, two chambers 99 and 100.

Opening into the chamber 99 is one end of a passageway 101 that extends through the casing 13 and at its opposite end opens into the hereinbefore-mentioned passageway 26 that is supplied with fluid under pressure from the brake pipe 1. Consequently, fluid under pressure will flow from the chamber 27 to the chamber 99 via the choke 26a and passageways 26 and 101 to charge this chamber 99 to the pressure normally carried in the brake pipe 1.

Opening into the chamber 100 below the diaphragm 94 is one end of a passageway 102 that extends through the cover member 63 and the casing 13 and opens at its other end into the passageway 88 intermediate the ends thereof. Since the passageway 88 is connected to the auxiliary reservoir 4 via groove 67 on piston valve 61 while it is in the position shown in FIG. 1B, passageway 87, choke 89 and passageway and pipe 49, fluid under pressure will be supplied from the auxiliary reservoir 4 to the chamber 100.

Furthermore, when the piston valve 61 is moved to its lower position in a manner hereinafter described, the groove 66 thereon will connect the passageway 87 to the passageway 88. Therefore, fluid under pressure is always supplied from the auxiliary reservoir 4 to the chamber 100 below the diaphragm 94 and to the lower end of main valve 18.

Since the pressure in the auxiliary reservoir 4 is normally the same as that in the brake pipe 1, it is apparent that the pressures in the chambers 99 and 100 on the opposite sides of the diaphragm 94 are usually the same.

The hereinbefore-mentioned valve stem 95 extends through a bore 103 provided therefor in the cover member 63 and, upon deflection of the diaphragm 94 in response to the pressure in the chamber 99 exceeding that in the chamber 100, is effective to unseat a flat disc valve 104 from an annular valve seat 105 to establish a communication between a chamber 106 and a chamber 107.

Opening into the chamber 106 is one end of a passageway 108 that extends through the cover member 63 and casing 13 and at its opposite end opens into the passageway 50 intermediate the ends thereof. Since the passageway 50 is connected to the emergency reservoir 3 via the correspondingly numbered pipe, fluid under pressure is always supplied from the emergency reservoir 3 to the chamber 106 via pipe and passageway 50 and passageway 108.

A passageway 109 in the cover member 63 opens at one end into the chamber 107 and at the other within an annular valve seat 110 against which a flat disc valve 111 is normally biased by a spring 112 to cut off flow from the passageway 109 to a chamber 113 that is connected to the passageway 101 by a short passageway 114.

The service portion 11 of the brake control valve device 5 further includes a brake cylinder limiting valve device 115 for controlling flow of fluid under pressure from the quick service volume chamber 54 to the brake cylinder 2.

The brake cylinder limiting valve device 115 comprises an annular flexible diaphragm 116 the outer periphery of which is clamped between the casing 13 and the top cover member 16.

A spool-type brake cylinder limiting valve 117 has formed integral therewith a diaphragm follower 118 between which and an annular diaphragm follower plate 119 the inner periphery of the diaphragm 116 is clamped by a nut 120 that has screw-threaded engagement with external screw threads provided therefor on a stem 121 that is integral with the diaphragm follower 118 and extends from the upper side thereof through the diaphragm follower plate 119.

The spool valve 117 is sealably and slidably mounted in a bottomed bore 122 provided therefor in the casing 13 which in cooperation with the diaphragm 116 and the top cover member 16 forms on the respective opposite sides of this diaphragm 116 a pair of chambers 123 and 124.

Disposed in the chamber 123, which is constantly open to atmosphere via a short passageway 125 in the cover member 16, is a spring 126 that is interposed between this cover member 16 and the diaphragm follower plate 119 to normally bias the diaphragm follower 118 against an annular stop 127 that surrounds the upper end of the bottomed bore 122 that opens into the chamber 124 into which also opens the other end of the hereinbefore-mentioned passageway 82.

As shown in FIG. 1B, the spool-type valve 117 is provided with an elongated peripheral annular groove 128 that, while this valve 117 occupies the position shown, establishes a communication between a pair of passageways 129 and 130 one end of each of which opens at the wall surface of the bottomed bore 122 this end of the passageway 129 being above that of the passageway 130. The passageway 129 extends through the casing 13 and at its opposite end opens into the passageway 82 intermediate the ends thereof and the passageway 130 extends through this casing 13 and at its opposite end opens into the quick service volume chamber 54. A brake cylinder limiting valve choke 131 is disposed in the passageway 130 to control the rate of flow of fluid under pressure therethrough from the quick service volume chamber 54 to the brake cylinder 2 (FIG. 1A) in a manner hereinafter explained.

In order to provide for maintaining the pressure in the auxiliary reservoir 4 against leakage, one end of a passageway 132 (FIG. 1B) in the casing 13 opens into the hereinbefore-mentioned passageway 26 intermediate the ends thereof and the other end opens via a choke 132a within an annular valve seat 133 against which a flat disc valve 134 is normally biased by a spring 135 that is interposed between this valve 134 and the top cover member 16. This spring 135 and valve 134 are disposed in a chamber 136 into which opens one end of a passageway 137 that extends through the casing 13 and at its opposite end opens at the wall surface of the bottomed bore 42 at a location just below the upper end thereof.

Since the passageway 26 is connected to the brake pipe 1 via choke 26a, chamber 27, choke 35, strainer device 30, chamber 29, passageway 39, dirt collector 6, and branch pipe 7, should the pressure in the auxiliary reservoir 4 be reduced by leakage therefrom to a value less than that in the brake pipe 1, fluid under pressure will flow from the brake pipe 1 to the passageway 26 via the pathway just described and thence to the auxiliary 4 via passageway 132, choke 132a, past valve 134, chamber 136, passageway 137, bottomed bore 42, chamber 25, and passageway and pipe 49 to maintain the pressure in the auxiliary reservoir 4 substantially the same as that carried in the brake pipe.

Also opening at the wall surface of the bottomed bore 42 is one end of a passageway 138 that extends through the casing 13 and at its opposite end opens into the chamber 27 (FIG. 1A). A choke 139 disposed in this passageway 138 at the end thereof opening into the chamber 27 to which fluid under pressure is supplied from the brake pipe 1 controls the rate of flow of fluid under pressure from the brake pipe 1 to the quick service volume chamber 54 when the spool valve 18 is shifted in a manner hereinafter described to a position in which the groove 45 on this valve 18 establishes a communication between the passageways 138 and 52.

The emergency valve device 12 shown in FIG. 1A of the drawings is substantially the same in construction and operation as the emergency valve device described in the above-mentioned U.S. Pat. No. 2,031,213. Since reference may be had to this patent for a complete description of the structure and operation of the emergency valve device 12, it is deemed unnecessary to show and describe it in detail herein.

OPERATION

INITIAL CHARGING

To initially charge the brake apparatus shown in the drawings, fluid under pressure is supplied to the brake pipe 1 (FIG. 1A) in the usual well-known manner, and with a cut-out valve 140, which constitutes the cut-out valve of the combined cut-out cock and centrifugal dirt collector 6, in open position, as shown in FIG. 1A of the drawings, fluid under pressure thus supplied to the brake pipe 1 flows therefrom to the strainer chamber 29 in the pipe bracket 8 via branch pipe 7, cut-out valve 140 and passageway 39. Normally, fluid under pressure thus supplied to the chamber 29 flows through the strainer device 30 to the passageway within the inner perforated tubular retainer 32 and from thence flows through the choke 35 in the plug 31 to the chamber 27, and also through the passageway 36 to the emergency valve piston chamber (not shown) in the emergency valve device 12.

With the diaphragm 17 and spool valve 18 in the brake release position, as shown in FIG. 1B, fluid under pressure that is conveyed to the chamber 27 flows therefrom to the chamber 24 above the diaphragm 17 via the choke 26a and passageway 26.

Furthermore, fluid under pressure flows from the chamber 27 to the chamber 25 below the diaphragm 17 via the brake pipe charging choke 40, passageway 41, groove 44 on main spool valve 18, passageway 48 and groove 43 on this valve 18 and thence from the chamber 25 to the auxiliary reservoir 4 via passageway and pipe 49. From the passageway 48 fluid under pressure also flows to the emergency reservoir 3 via passageway and pipe 50 and the emergency reservoir charging choke 51 so that both the auxiliary reservoir 4 and the emergency reservoir 3 are charged with fluid under pressure from the brake pipe 1 to the pressure normally carried thereon.

The choke 51 in combination with choke 40 retards the rate of flow of fluid under pressure from the brake pipe 1 to the emergency reservoir 3, so that more fluid under pressure will flow toward the back end of the train than would be the case if the flow to this reservoir 3 were at a fast rate.

Referring to FIG. 1B, it will be noted that some of the fluid under pressure supplied to the passageway 50 flows via passageway 108 to the chamber 106 in the accelerated service release valve device 64 so that the pressure in this chamber 106 is the same as that in the emergency reservoir 3.

Moreover, it is apparent from FIGS. 1A and 1B that some of the fluid under pressure supplied to the chamber 27 flows therefrom to the chamber 99 via choke 26a and passageways 26 and 101. Also, it is apparent that some of the fluid under pressure supplied to the passageway 49 flows therefrom to the chamber 100 via choke 89, passageway 87, groove 67 on piston valve 61, and passageways 88 and 102. Consequently, chambers 99 and 100 on the respective opposite sides of the diaphragm 94 of the accelerated service release valve device 64 are charged respectively to the pressures in the brake pipe 1 and the auxiliary reservoir 4. Since these pressures are normally equal, a spring 141 that is interposed between a plug 142 that has screw-threaded engagement with the cover member 63 and the valve 104 is effective to seat this valve on its seat 105 to close communication between chambers 106 and 107.

Since the passageway 88 opens into the bottom of the bottomed bore 42, it may be seen from FIG. 1B that fluid under pressure from the auxiliary reservoir 4 and passageway 49 is effective on the lower end of the spool valve 18. Accordingly, it is apparent that the entire effective area of the lower side of the diaphragm 17 is subject to the pressure in the auxiliary reservoir 4 and the entire effective area of the upper side of this diaphragm is subject to the pressure in the brake pipe 1. The pressure in the brake pipe 1 and that in the auxiliary reservoir 4 are normally the same and a spring 143, interposed between the diaphragm follower plate 20 and the cover member 16, is provided to insure that the diaphragm follower 19 is normally biased against a stop surface 144 formed on the casing 13 to maintain the diaphragm 17 and spool valve 18 in their release position shown in FIG. 1B.

While the spool valve 18 occupies its release position shown in FIG. 1B, the upper end of bottomed bore 56 is open to atmosphere via the passageway 58, groove 46 on valve 18, and passageways 59 and 53. Consequently, the spring 62 is effective to bias the spool-type cylinder application piston valve 61 to its upper position in which it is shown.

Likewise, the upper end of bottomed bore 57 is open to atmosphere via the passageway 60, groove 46 and passageways 59 and 53 so that spring 81 is normally effective to bias the spool-type brake cylinder exhaust piston valve 78 to its upper position.

While the piston valves 61 and 78 occupy their upper position in which they are shown in FIG. 1B, the brake cylinder 2 (FIG. 1A) is open to atmosphere via pipe and passageway 76, the communication denoted by the reference numeral 77, passageway 73, the communication denoted by the reference numerals 75 and 74 (FIG. 1B), passageway 69, groove 66 on piston valve 61, passageway 70, groove 80 on piston valve 78, passageway and pipe 83 and retainer valve device 84 (FIG. 1B) which occupies its direct exhaust position, as hereinbefore stated.

Moreover, the quick service volume chamber 54 is open to atmosphere through two pathways. The first of these pathways extends from this quick service volume chamber 54 to atmosphere via passageway 52, groove 45 on spool valve 18, and passageway 53. The second of these pathways extends from this chamber 54 to atmosphere via passageway 130, choke 131, groove 128 on spool valve 117, passageways 129 and 82, groove 80 on piston valve 78, passageway and pipe 83 and retainer valve device 84.

SERVICE APPLICATION

A service application of the brakes is initiated by effecting a gradual reduction in brake pipe pressure at a service rate in the usual well-known manner. Since, as hereinbefore described, the brake pipe 1 is in communication with the chamber 24 (FIG. 1B) via the choke 26a and in communication with the chamber 25 via the choke 40 which is smaller than the choke 26a, the pressure in the chamber 24 will reduce faster than the pressure in the chamber 25 in response to this reduction of pressure in the brake pipe 1.

Upon a predetermined, but light reduction of the pressure in the chamber 24, the pressure in the chamber 25 will exceed that in the chamber 24 sufficiently to establish a differential fluid pressure force that acts on the diaphragm 17 in an upward direction. This differential fluid pressure force acting in an upward direction on the effective area of the diaphragm 17 will deflect this diaphragm upward to cause the spool-type valve 18 to be shifted in an upward direction.

Figure 2:
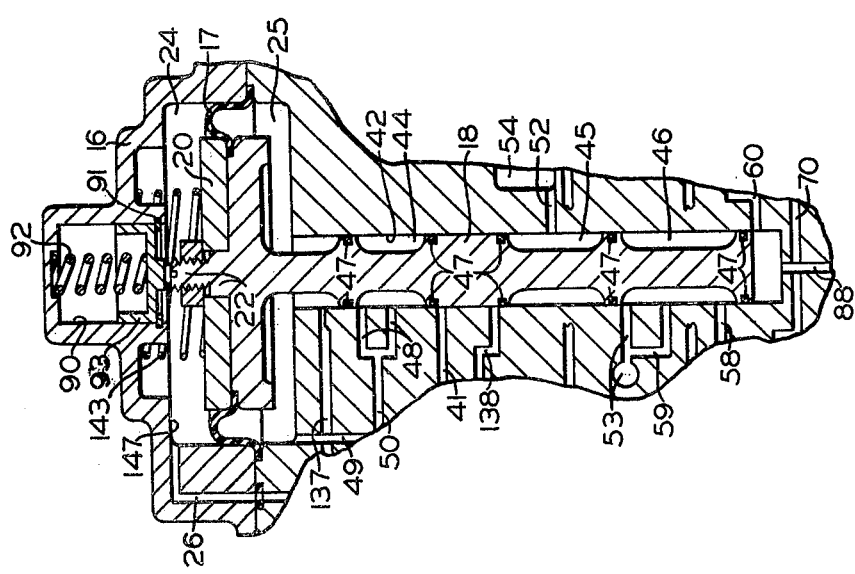
FIG. 2 is a fragmentary sectional diagrammatic view of the main spool-type valve of FIG. 1 in the second one of its four positions.

As the spool-type valve 18 is shifted in an upward direction from its release position in which it is shown in FIG. 1B, it will be seen that when this valve 18 reaches the position in which it is shown in FIG. 2 of the drawings, it being understood that this valve is not stopped in this position, the groove 44 on this valve 18 no longer establishes a communication between the passageways 41 and 48. Furthermore, communication between the passageway 48 and the chamber 25 is cut off since the upper O-ring seal 47 forms a seal with the wall surface of the bottomed bore 42 above the location at which the upper end of the passageway 48 opens at this wall surface. Accordingly, it is apparent that the charging communication from the brake pipe 1 to both the emergency reservoir 3 and auxiliary reservoir 4 is cut off.

Moreover, the groove 45 on the valve 18 no longer establishes a communication between the passageways 52 and 53. Consequently, the quick service volume 54 is no longer open to atmosphere via the exhaust passageway 53.

It will be noted from FIG. 2 that the O-ring seal 47 carried by the spool valve 18 adjacent its lower end forms a seal with the wall surface of the bottomed bore 42 above the location at which the hereinbefore-mentioned other end of the passageway 60 opens at this wall surface. Therefore, fluid under pressure will flow from the auxiliary reservoir 4 to the upper side of the valve piston 78 via pipe and passageway 49, choke 89, passageway 87, groove 67 on piston valve 61 which occupies the position shown in FIG. 1B, passageway 88, lower end of bottomed bore 42 and passageway 60 to cause this spool-type brake cylinder exhaust piston valve 78 to be shifted downward against the yielding resistance of the spring 81 until the lower end of this piston valve 78 abuts the upper end of the cover member 63.

While this piston valve 78 occupies its lower position, the passageway 70 is cut off from the passageway 83 so that the brake cylinder 2 (FIG. 1A) is no longer open to atmosphere via the pathway hereinbefore described.

It will be noted from FIG. 2 that the groove 46 on valve 18 establishes a communication between passageways 58 and 53 so that the upper end of the brake cylinder application piston valve 61 remains open to atmosphere.

Figure 3:
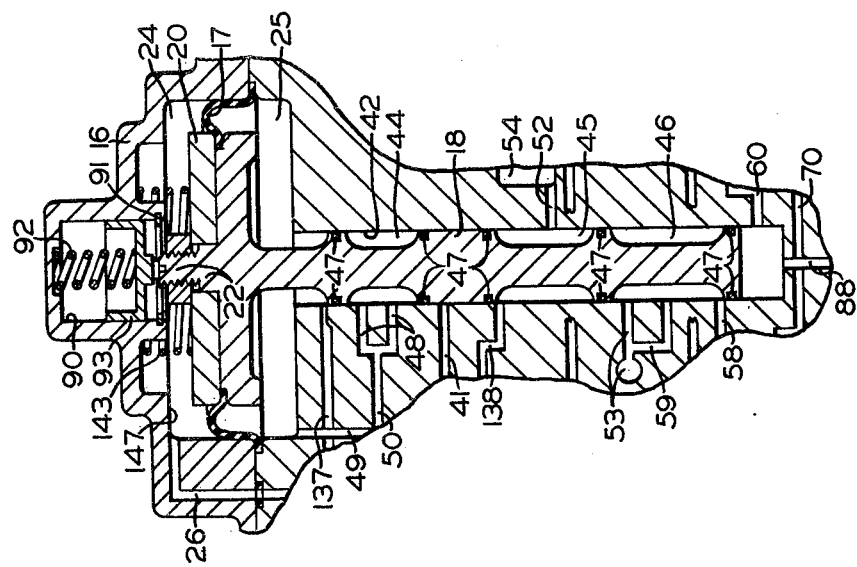
FIG. 3 is a fragmentary sectional diagrammatic view of the main spool-type valve in its third position.

Moreover, it may be seen from FIG. 2 that the upper end of the stem 22 abuts the lower side of the stabilizing piston 93. Consequently, as the pressure in the chamber 24 above the diaphragm 17 continues to reduce faster than the pressure in the chamber 25 below this diaphragm, the increasing differential fluid pressure force, upon increasing to a value sufficient to overcome the force of spring 92, will deflect this diaphragm 17 upward against the yielding resistance of the spring 92 to cause the spool valve 18 to be shifted further in an upward direction. Consequently, it is apparent that when the valve 18 reaches the position in which it is shown in FIG. 3, the groove 45 thereon establishes a communication between the passageways 138 and 152.

Accordingly, fluid under pressure will now flow from the brake pipe 1 (FIG. 1A) to the quick service volume chamber 54 (FIG. 1B) via branch pipe 7, open cut-out valve 140, dirt collector 6, passageway 39, chamber 29, strainer device 30, choke 35, chamber 27, choke 139 (FIG. 1B), passageway 138, groove 45 (FIG. 3) on valve 18 and passageway 52. The fluid under pressure thus supplied from the brake pipe 1 to the quick service volume chamber 54 flows therefrom to the brake cylinder 2 (FIG. 1A) via passageway 130 (FIG. 1B), choke 131, groove 128 on spool-type brake cylinder limiting valve 117, passageways 129 and 82, groove 79 on piston valve 78 now in its lower position, passageway 70, groove 66 on piston valve 61 now in its upper position, as shown in FIG. 1B, since groove 46 on valve 18 connects passageways 58 and 59 as shown in FIG. 3, passageway 69, the communication indicated by reference numerals 74 and 75, passageway 73, the communication indicated by reference numeral 77 (FIG. 1A) and passageway and pipe 76.

The initial local quick service flow of fluid under pressure from the brake pipe 1 to the quick service volume chamber 54 is at a fast rate determined by the size of the choke 139 until the brake pressure substantially equalizes into the quick service volume chamber 54. The fluid under pressure thus supplied to the quick service volume chamber 54 flows therefrom to the brake cylinder 2 (FIG. 1A) at a slower rate determined by the size of the choke 131 (FIG. 1B).

It will be noted from FIG. 1B that the hereinbefore-mentioned other end of the passageway 82 opens into the chamber 124 below the diaphragm 116 of the brake cylinder limiting valve device 115. Consequently, it is apparent that fluid under pressure will flow from the quick service volume chamber 54 to the chamber 124 to cause the pressure in this chamber 124 to increase simultaneously as the pressure in the brake cylinder 2 is increased by the flow of fluid under pressure thereto from the quick service volume chamber 54. Accordingly, when the pressure in the chamber 124 is increased sufficiently to deflect the diaphragm 116 upward against the yielding resistance of the spring 126, the brake cylinder limiting valve 117 will be shifted upward from the position shown in FIG. 1B until the diaphragm follower plate 119 abuts a stop surface 145 formed on the top cover member 16. In this upper position of the brake cylinder limiting valve 117, the lower one of a pair of O-ring seals 146 carried in peripheral annular grooves adjacent the respective opposite ends of the elongated groove 128 on this valve 117 forms a seal with the wall surface of the bottomed bore 122 above the location at which the hereinbefore-mentioned one end of the passageway 130 opens at this wall surface. Consequently, upon the brake cylinder limiting valve 117 reaching its upper position, communication is closed between passageways 130 and 129 thereby preventing further flow of fluid under pressure from the quick service volume chamber 54 to the chamber 124 below the diaphragm 116 and the brake cylinder 2. Accordingly, it is apparent that fluid under pressure is supplied from the brake pipe 1 to the brake cylinder 2 until the pressure in the brake cylinder 2 is built up to a value dependent upon the strength of the spring 126. The strength of this spring 126 may be so selected that, for example, a pressure of ten pounds per square inch pressure is obtained in the brake cylinder 2 before communication is closed between passageways 130 and 129 to cut off flow from the quick service volume chamber 54 to the brake cylinder 2.

From the foregoing it will be noted that, when a brake application is effected, fluid under pressure is vented from the brake pipe 1 to the quick service volume chamber 54 after which the fluid under pressure thus supplied to this volume chamber 54 flows therefrom to the brake cylinder 2 until a certain chosen pressure, for example, 10 pounds per square inch, is obtained in this brake cylinder 2 whereas the service portion denoted by the reference numeral 11 in the hereinbefore-mentioned U.S. Pat. No. 3,175,869 operates to supply fluid under pressure from the brake pipe 1 to the quick service volume chamber 79 shown in FIG. 1B of this patent until the pressure in the brake pipe substantially equalizes into this volume chamber and then subsequently operates to supply fluid under pressure from the brake pipe 1 to a brake cylinder 2 independently of this chamber 79 or without flowing first to this chamber 79 and thence from this chamber to the brake cylinder 2.

By always venting fluid under pressure from the brake pipe 1 into a quick service volume chamber of a certain chosen size and then supplying fluid under pressure from this volume chamber to the brake cylinder until a certain chosen pressure is obtained in the brake cylinder rather than first venting fluid under pressure from the brake pipe into the volume chamber without supplying any fluid under pressure to the brake cylinder and then subsequently venting fluid under pressure from the brake pipe to the brake cylinder while no fluid under pressure flows from the brake pipe to the volume chamber until the certain chosen pressure is obtained in the brake cylinder insures that the quick service brake pipe reduction effected upon each brake application is substantially the same.

Now as the pressure in the chamber 24 continues to reduce faster than the pressure in the chamber 25, the differential fluid pressure force acting in an upward direction on the diaphragm 17 will correspondingly increase. Consequently, this diaphragm 17 will continue to be deflected upward against the continuing yielding resistance of the spring 92 to cause the spool valve 18 to be shifted further in an upward direction until the diaphragm follower plate 20 abuts a stop surface 147 formed on the top cover member 16, as shown in FIG. 4 of the drawings.

Figure 4:
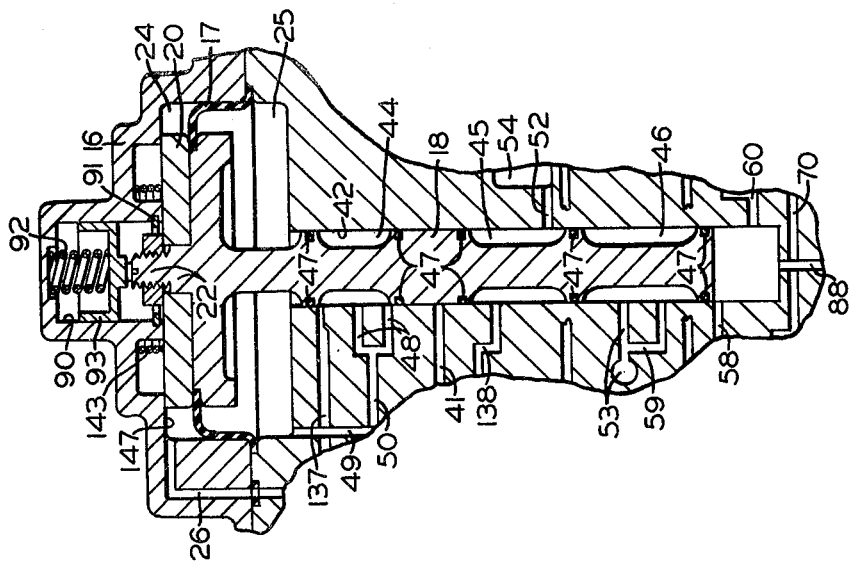
FIG. 4 is a fragmentary sectional diagrammatic view of the main spool-type valve in its fourth position.

Upon the spool valve 18 being shifted upward to the position in which it is shown in FIG. 4, the O-ring seal 47 adjacent the lower end of the elongated groove 46 on this valve 18 forms a seal with the wall surface of the bottomed bore 42 above the location at which the hereinbefore-mentioned one end of the passsageway 58 opens at this wall surface. Therefore, fluid under pressure will now flow from the auxiliary reservoir 4 (FIG. 1A) to the upper end of the piston valve 61 (FIG. 1B) via pipe and passageway 49, choke 89, passageway 87, groove 67 on piston valve 61, passageway 88, lower end of bottomed bore 42 and passageway 58 to cause this piston valve 61 to be moved downward against the yielding resistance of the spring 62 until the lower end of this piston valve 61 abuts the upper end of the bottom cover member 63.

While the piston valve 61 occupies its lower position, the upper groove 66 thereon establishes a communication between the passageways 87 and 88 so that the upper end of this piston valve is subject to fluid under pressure present in the auxiliary reservoir 4 to maintain this piston valve in its lower position.

Moreover, while the piston valve 61 occupies its lower position, the upper groove 66 thereon also establishes a communication between the passageways 87 and 69. Consequently, fluid under pressure will flow from the auxiliary reservoir 4 to the brake cylinder 2 via pipe and passageway 49, brake cylinder buildup choke 89, passageway 87, groove 66 on piston valve 61 now in its lower position, passageway 69, the communication denoted by the reference numerals 74 and 75, passageway 73, the communication denoted by the numeral 77 (FIG. 1A), and passageway and pipe 76.

Fluid under pressure will now flow from the auxiliary reservoir 4 and the chamber 25 connected thereto via passageway and pipe 49 at a rate controlled by the size of the choke 89.

It will be noted from FIGS. 3 and 4 that the groove 45 on spool valve 18 establishes a communication between passageways 138 and 52. Consequently, it is apparent the fluid under pressure is supplied from the brake pipe 1 to the brake cylinder 2 until the pressure in the chamber 124 deflects brake cyliner limiting valve diaphragm 116 upward to cause limiting valve 117 to close communication between passageways 130 and 129. Thus, cut off of the supply of fluid under pressure from the brake pipe 1 to the brake cylinder 2 is controlled by the brake cylinder limiting valve device 115 and not by movement of the spool-type main valve 18.

Upon a reduction of pressure in the brake pipe 1 at a service rate, the emergency valve device 12 operates in the same manner as described in detail in the hereinbefore-mentioned Farmer patent.

SERVICE LAP

In order to limit the degree of the brake application, the pressure in the brake pipe 1 is only reduced an amount sufficient to effect the desired service application. Accordingly, when the pressure in the auxiliary reservoir 4 (FIG. 1A) and the chamber 25 (FIG. 1B) is reduced by flow to the brake cylinder 2, via the pathway described above, an amount substantially equal to the degree of brake pipe reduction in the chamber 24, the spring 92 is rendered effective to shift the valve 18 downward from the position in which it is shown in FIG. 4 to the position shown in FIG. 3.

Upon the valve 18 being shifted downward by the spring 92 to the position shown in FIG. 3, the groove 46 on this valve 18 establishes a communication between the passageways 58 and 59 whereupon fluid under pressure is released from the upper end of the brake cylinder application piston valve 61 (FIG. 1B) to atmosphere via passageway 58, groove 46 on valve 18, and passageways 59 and 53. As fluid under pressure is thus released from the upper end of piston valve 61, the spring 62 is rendered effective to shift the piston valve 61 upward to the position in which it is shown in FIG. 1B. In this upper position the groove 66 on the piston valve 61 no longer establishes a communication between passageways 87 and 69. Thus, upon the spring 62 shifting the piston valve 61 to its upper position, flow of fluid under pressure from the auxiliary reservoir 4 to the brake cylinder 2 is cut off.

It will be noted from FIG. 3 of the drawings that the hereinbefore-mentioned opposite end of the passageway 137 opens at the wall surface of the bottomed bore 42 above the location at which the upper O-ring seal 47 carried by the valve 18 forms a seal with this wall surface. Consequently, fluid under pressure may flow from the brake pipe 1 to the auxiliary reservoir 4 via branch pipe 7, cut-out valve 140, dirt collector 6, passageway 39, chamber 29, strainer device 30, choke 35, chamber 27, choke 26a, passageways 26 and 132, choke 132a, past valve 134, chamber 136, passageway 137, upper end of bottomed bore 42, chamber 25 and pipe and passageway 49 at a rate controlled by the chokes 26a and 132a to maintain the pressure in the auxiliary reservoir 4 against leakage so long as the rate of leakage from the auxiliary reservoir 4 does not exceed the capacity of these two chokes in series. This constitutes an auxiliary reservoir pressure maintaining feature that is effective while the brakes are applied to prevent an undesired release of the brakes due to auxiliary reservoir leakage.

It will be noted from FIG. 3 that the lower O-ring seal 47 carried by the spool valve 18 forms a seal with the wall surface of the bottomed bore 42 above the location at which the hereinbefore-mentioned other end of the passageway 60 opens at this wall surface. Consequently, the auxiliary reservoir 4 remains connected to the upper end of the bottomed bore 57 so that fluid under pressure from the auxiliary reservoir 4 is effective on the upper end of the piston valve 78 to maintain it in its lower position in which communication is closed between passageway 70, which is connected to the brake cylinder 2, and passageway 83, which is connected to the retainer valve device 84, to thereby prevent the release of fluid under pressure from the brake cylinder 2 to atmosphere and a corresponding release of the brake application.

If, after effecting a limited application of the brakes, it is desired to increase the brake cylinder pressure, a further reduction in brake pipe pressure is effected through the medium of the brake valve device (not shown) on the locomotive which reduction causes the diaphragm 17 to be deflected upward to shift the spool valve 18 upward from the position shown in FIG. 3 to the position shown in FIG. 4. In this position the lower O-ring seal 47 carried by the valve 18 forms a seal with the wall surface of the bottomed bore 42 above the location at which the hereinbefore-mentioned other end of the passageway 58 opens at this wall surface. Consequently, fluid under pressure will again flow from the auxiliary reservoir 4 to the upper end of the piston valve 61 to shift this valve to its lower position in which the upper groove 66 thereon establishes a communication between the passageways 87 and 69. Therefore, fluid under pressure will again flow from the auxiliary reservoir 4 to the brake cylinder 2 until the pressure in the chamber 25 is reduced enough to cause the spool valve 18 to return to the position shown in FIG. 3. Thus, it is possible to obtain the service braking pressure up to full service (or equalization between auxiliary reservoir and brake cylinder) in a series of small increments or stages.

During a service application of the brakes, the accelerated service release valve device 64 is inoperative for the reason that brake pipe pressure is reduced in chamber 99 prior to any reduction in auxiliary reservoir pressure in chamber 100 and, subsequent to the reduction in brake pipe pressure in chamber 99, the auxiliary reservoir pressure in chamber 100 is reduced to the existing brake pipe pressure present in the chamber 99. Consequently, no pressure differential is established on the opposite sides of the diaphragm 94 to cause downward deflection of this diaphragm to unseat valve 104 from the annular valve seat 105.

RELEASE OF THE BRAKES FOLLOWING A SERVICE APPLICATION

To effect a release of the brakes after an application, fluid under pressure is supplied to the brake pipe 1 from the usual brake valve on the locomotive. This fluid under pressure flows from the brake pipe 1 to the passageway 36 leading to the emergency valve piston chamber in the emergency valve device 12 and the chamber 27 between pipe bracket 8 and service valve device 11 in the same manner as has been hereinbefore described in connection with the initial charging of the equipment. Fluid under pressure flows from the chamber 27 to the chamber 24 via choke 26a and the passageway 26.

Since passageway 41 is cut off from passageway 48, as shown in FIG. 3, to prevent flow of fluid under pressure from chamber 27 to chamber 25, the rapid increase in brake pipe pressure in chamber 24 creates a pressure differential on the diaphragm 17 which differential causes this diaphragm to deflect downward to promptly shift the spool valve 18 from the position shown in FIG. 3 to its release position in which it is shown in FIG. 1B.

When the main spool valve 18 is thus returned to the position shown in FIG. 1B, fluid under pressure in the quick service volume chamber 54 is vented to atmosphere via passageway 52, groove 45 on valve 18, and passageway 53.

Moreover, when the spool valve 18 is thus returned to the position shown in FIG. 1B, fluid under pressure is released from the upper end of piston valve 78 to atmosphere via passageway 60, groove 46 on spool valve 18, passageway 59 and passageway 53 whereupon the spring 81 is rendered effective to shift this piston valve 78 upward to the position in which it is shown in FIG. 1.

Therefore, when the piston valve 78 is thus returned to the position shown in FIG. 1B, the lower groove 80 thereon establishes a communication between the passageways 70 and 83. Consequently, fluid under pressure will be released from the brake cylinder 2 to atmosphere via pipe and passageway 76, the communication denoted by the reference numeral 77, passageway 73, the communication denoted by the reference numerals 75 and 74, passageway 69, upper groove 66 on piston valve 61, passageway 70, lower groove 80 on piston valve 78, passageway and pipe 83 and retainer valve device 84, thus releasing the service brake application.

Upon the return of the piston valve 78 to the position shown in FIG. 1B, the chamber 124 below the diaphragm 116 is connected to atmosphere via passageway 82, groove 80 on piston valve 78, passageway and pipe 83 and retainer valve device 84. Consequently, as the fluid under pressure in the chamber 124 is thus vented to atmosphere, the spring 126 is rendered effective to deflect this diaphragm 116 downward and shift the limiting valve 117 downward to the position shown in FIG. 1B.

When the limiting valve 117 is thus returned to the position shown in FIG. 1B, the quick service volume chamber 54 is connected to atmosphere via a second communication comprising passageway 130 and choke 131 therein, groove 128 on valve 117, passageways 129 and 82, groove 80 on piston valve 78, passageway and pipe 83, and retainer valve device 84.

Moreover, upon the return of the spool valve 18 to the position shown in FIG. 1B of the drawings, the upper O-ring seal 47 carried by this valve 18 forms a seal with the wall surface of the bottomed bore 42 between the locations at which the respective opposite ends of the passageway 48 open at the wall surface of this bottomed bore 42.

Accordingly, upon the return of the spool valve 18 to the position shown in FIG. 1B upon effecting a release of a service brake application, fluid under pressure will flow from the fully charged emergency reservoir 3 to the auxiliary reservoir 4 via pipe and passageway 50, choke 51 therein, passageway 48, groove 43 on valve 18, chamber 25, and passageway and pipe 49 at a rate determined by the size of the choke 51.

It will be noted from FIGS. 1A and 1B that upon effecting a brake release in the manner described above, fluid under pressure will flow from the brake pipe 1 to the chamber 99 above the diaphragm 94 of the accelerated service release valve device 64 at a rate determined by the size of the choke 26a. Also at this time, the fluid under pressure supplied from the emergency reservoir 3 to the auxiliary reservoir 4 may flow to the chamber 100 below the diaphragm 94 at a rate determined by the size of the choke 89 the diameter of which it may be assumed is less than that of the choke 26a.

Accordingly, the pressure in the chamber 99 will increase faster than the pressure in the chamber 100 thereby establishing a fluid pressure differential force that acts in a downward direction on the diaphragm 94 to deflect this diaphragm downward and, via the stem 95, unseat valve 104 from its seat 105.

Upon the unseating of valve 104 from its seat 105, a fluid pressure communication is established via which fluid under pressure is supplied from the emergency reservoir 3 to the brake pipe 1, this communication extending from the emergency reservoir 3 via pipe and passageway 50, passageway 108, chamber 106, past unseated valve 104 to chamber 107 and thence through passageway 109 to the inner seated area of the disc valve 111. When the pressure acting below the disc valve 111 increases sufficiently to overcome the biasing force of the spring 112 acting on the upper side thereof, this valve 111 will be unseated from its seat 110. With the disc valve 111 unseated, a fluid pressure communication is established through which fluid under pressure supplied to the passageway 109 from the emergency reservoir 3, as described above, is conveyed to the chamber 113 and thence through passageways 114, 101 and 26, choke 26a, chamber 27, choke 35 in plug 31, strainer device 30, chamber 29, passageway 39 in pipe bracket 8, dirt collector 6, open cut-out valve 140, and branch pipe 7 to the brake pipe 1. Thus, upon increasing the pressure in the brake pipe 1 to initiate a release of the brakes subsequent to a service brake application, a slight increase in brake pipe pressure above auxiliary reservoir pressure is effective to unseat valve 104 to establish a communication between the fully charged emergency reservoir 3 and the brake pipe 1 so that fluid under pressure flows from the emergency reservoir 3 to the brake pipe 1 until equalization of pressure therein occurs thus hastening a release of the brakes since all of the fluid under pressure supplied to the brake pipe 1 for effecting the release of the brakes does not have to be conveyed from the locomotive back through the brake pipe extending from car to car through the train.

It may be noted that the fluid under pressure supplied from the emergency reservoir to the chamber 27 when the valve 104 is unseated must flow through the chokes 26a and 35 in series in order to flow to the brake pipe 1. The choke 26a acts to restrict the flow to the chamber 27 and thereby effects a quick buildup of pressure in the chamber 24 above the diaphragm 17. This increase in pressure above the diaphragm 17, due to the restriction offered by the choke 26a, aids in quickly establishing a sufficient differential of pressure on the diaphragm 17 to deflect it in a downward direction to shift the spool-type main valve 18 to its release position to cause the piston valves 61 and 78 to vent to atmosphere the fluid under pressure in the brake cylinder 2.

When effecting a release of the brake, the emergency valve device 12 (FIG. 1A) operates in substantially the same manner, as described in detail in the herein-before-mentioned Farmer patent. Hence, a detailed description of its operation during a release of the brakes is not deemed necessary herein.

Having now described the invention what I claim as new and desire to secure by Letters Patent, is:

1. For use in a brake apparatus including a brake pipe, an auxiliary reservoir and an emergency reservoir each normally charged to a certain chosen pressure and a brake cylinder, a fluid-pressure-operated triple valve device comprising;

a. a casing having therein a plurality of bores and a plurality of passageways, at least one end of certain of said passageways opening at the wall surface of one of said bores and the other end connected respectively to the brake pipe, the auxiliary reservoir and the emergency reservoir, one end of a first pair of said plurality of passageways other than said certain passageways opening at the wall surface of said one bore and the other end of each of said first pair of passageways opening respectively at the wall surface of one and the other of a first pair of said plurality of bores other than said one bore, wherein the improvement comprises:

b. a main spool-type valve having thereon a plurality of spaced-apart elongated peripheral annular grooves, said valve being slidably mounted in said one bore, c. a movable abutment operatively connected to said main spool-type valve and subject on its respective opposite sides to the pressure in the brake pipe and in the auxiliary reservoir, the deflection of said abutment responsive to the pressure on either side thereof exceeding that on the other side being effective to cause shifting of said main valve in said one bore, d. a spool-type piston valve having thereon a plurality of spaced-apart elongated peripheral annular grooves slidably mounted in each of said pair of bores, and e. means for biasing the piston valve in each one of said pair of bores to one of two positions whereby, while the piston valve in each of said pair of bores occupies its said one position, the brake cylinder is open to atmosphere, one of said piston valves being shiftable to the other of its two positions to cut off the brake cylinder from atmosphere upon the supply of fluid under pressure thereto responsive to shifting of said main valve to one position in said one bore, and the other of said piston valves being shiftable to the other of its two positions to establish a communication between the auxiliary reservoir and the brake cylinder upon the supply of fluid under pressure thereto responsive to shifting of said main valve to another position in said one bore.

2. A fluid-pressure-operated triple valve device, as recited in claim 1, further characterized in that the spool-type piston valve slidably mounted in each one of said pair of bores is identical to and interchangeable with the piston valve slidably mounted in the other one of said pair of bores.

3. A fluid-pressure-operated triple valve device, as recited in claim 1, further characterized in that the diameter of said main spool-type valve is substantially less than the diameter of said spool-type piston valves.

4. A fluid-pressure-operated triple valve device, as recited in claim 1, further characterized in that said casing has formed therein a quick service volume chamber, and one of said elongated peripheral annular grooves on said main spool valve in certain positions of said main valve establishes a communication between one end of a second pair of said plurality of passageways other than said certain passageways and said first pair of passageways that open at the wall surface of said one bore, the other end of each of said second pair of passageways opening respectively into the brake pipe and said quick service volume chamber, said one elongated peripheral annular groove on said main spool valve in a position of said valve other than said certain positions cutting off communication between the one end of one of said second pair of passageways and the one end of the other one of said second pair of passageways.

5. A fluid-pressure-operated triple valve device, as recited in claim 4, further characterized by a fluid pressure operated spool-type brake cylinder limiting valve for controlling flow of fluid under pressure from said quick service volume chamber to the brake cylinder.

6. A fluid-pressure-operated triple valve device, as recited in claim 5, further characterized in that said spool-type brake cylinder limiting valve is slidably mounted in one of said plurality of bores in said casing other than said hereinbefore-mentioned bores in said casing, and a third pair of said plurality of passageways so open at one end at the wall surface of said one bore, the other end of said third pair of passageways opening respectively into said quick service volume chamber and at the wall surface of one of said first pair of bores in said casing whereby, while said spool-type brake cylinder limiting valve is in one of two positions and said one piston valve is in its one position, said quick service volume chamber is open to atmosphere via said limiting valve and said one piston valve.

7. For use in a brake apparatus including a brake pipe and a reservoir each normally charged to a certain chosen pressure, and a brake cylinder, a fluid pressure operated valve device comprising;
   a. a casing having therein a quick service volume chamber, a plurality of bores and a plurality of passageways, one end of a first pair of said passageways opening at the wall surface of one of said bores and the other end connected respectively to the brake pipe and to said quick service volume chamber, and one end of each of a second pair of said passageways opening at the wall surface of another of said bores and connected respectively to said quick service volume chamber and to the brake cylinder,
   b. a first spool-type valve slidably mounted in said one bore and having thereon an elongated peripheral annular groove for controlling flow of fluid under pressure from one of said first pair of passageways to the other,
   c. a first movable abutment operatively connected to said first spool-type valve and subject on its respective opposite sides to the pressure in the brake pipe and in the auxiliary reservoir, the deflection of said abutment in response to a reduction of the pressure in the brake pipe to a value below that in the auxiliary reservoir being effective to shift said first spool valve to a position in which said groove thereon establishes a communication between said first pair of passageways whereupon fluid under pressure flows from said brake pipe to said quick service volume chamber,
   d. a second spool-type valve slidably mounted in said another bore and having thereon an elongated peripheral annular groove for controlling flow of fluid under pressure from one of said second pair of passageways to the other,
   e. biasing means effective to exert a chosen force, and
   f. a second movable abutment operatively connected to said second spool-type valve and subject on its respective opposite sides to said biasing means and the pressure supplied to said other passageway of said second pair of passageways from said one passageway of said second pair of passageways whereby fluid under pressure flows from said quick service volume chamber to the brake cylinder until the pressure therein and in said other passageway of said second pair of passageways establishes a fluid pressure force on said second movable abutment that exceeds said chosen force of said biasing means.

8. For use in a brake apparatus including a brake pipe and a reservoir each normally charged to a certain chosen pressure and a brake cylinder, a fluid pressure operated valve device, as recited in claim 7, further characterized in that said first spool-type valve and said second spool-type valve are cooperatively operative to control two separate communications through which fluid under pressure may be released from said quick service chamber to atmosphere.

9. For use in a brake apparatus including a brake pipe and a reservoir each normally charged to a certain chosen pressure and a brake cylinder, a fluid pressure operated valve device, as recited in claim 7, further characterized by a third spool-type valve slidably mounted in a third one of said plurality of bores in said casing and having thereon and elongated peripheral annular groove for, while in a first position, providing for flow of fluid under pressure from said quick service volume chamber to the brake cylinder, and while in a second position, providing for flow of fluid under pressure from said quick service volume chamber to atmosphere.

10. For use in a brake apparatus including a brake pipe and a reservoir each normally charged to a certain chosen pressure and a brake cylinder, a fluid pressure operated valve device, as recited in claim 9, further characterized in that the diameter of said third spool-type valve is substantially greater than the diameter of said first spool-type valve.

* * * * *